Dec. 22, 1942.  I. S. BLACK  2,306,243
METHOD OF AND APPARATUS FOR MAKING FLUID FILLED GOLF BALL CORES
Filed Aug. 26, 1941  2 Sheets-Sheet 2
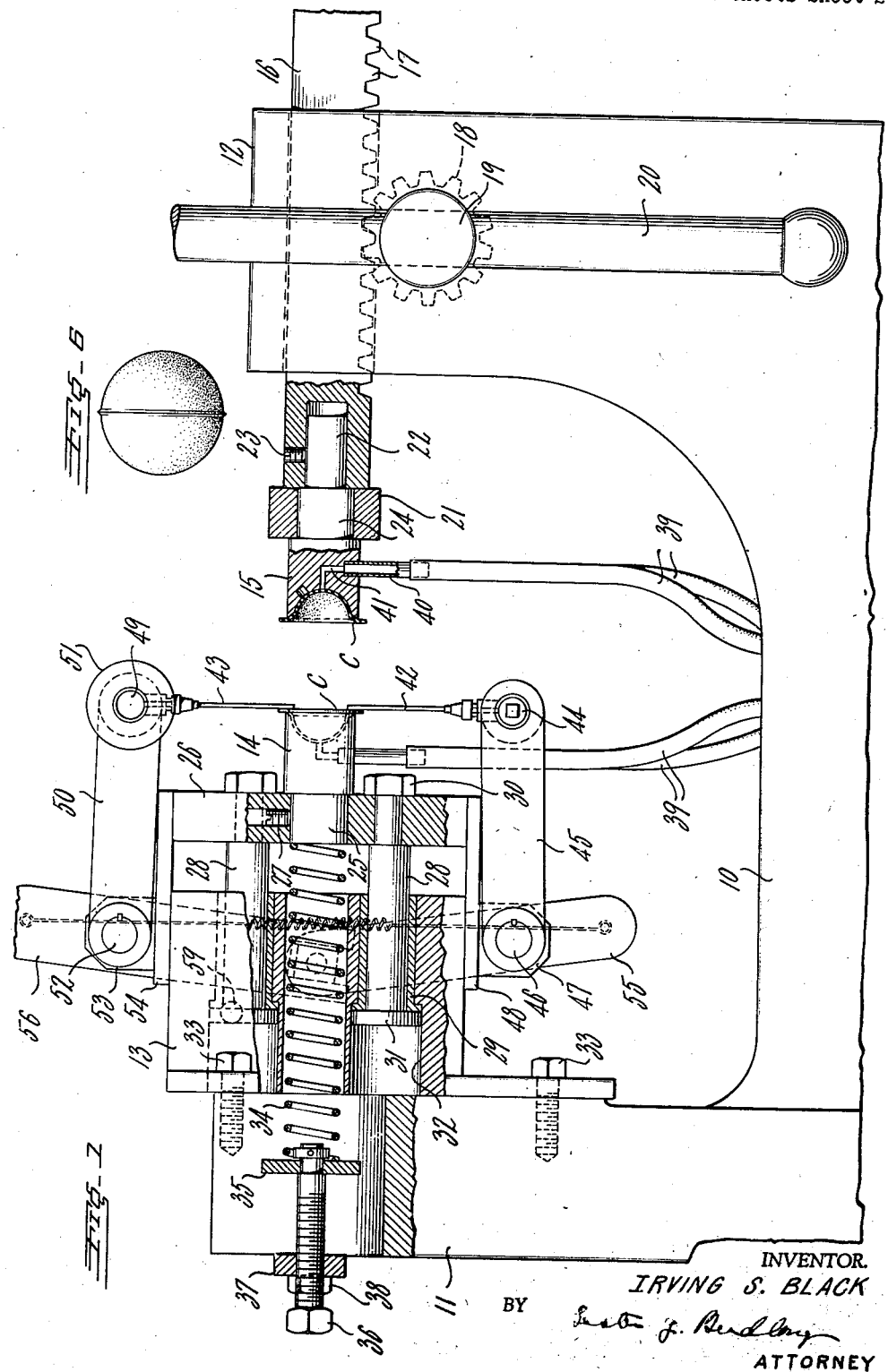
INVENTOR.
IRVING S. BLACK
BY
ATTORNEY Patented Dec. 22, 1942

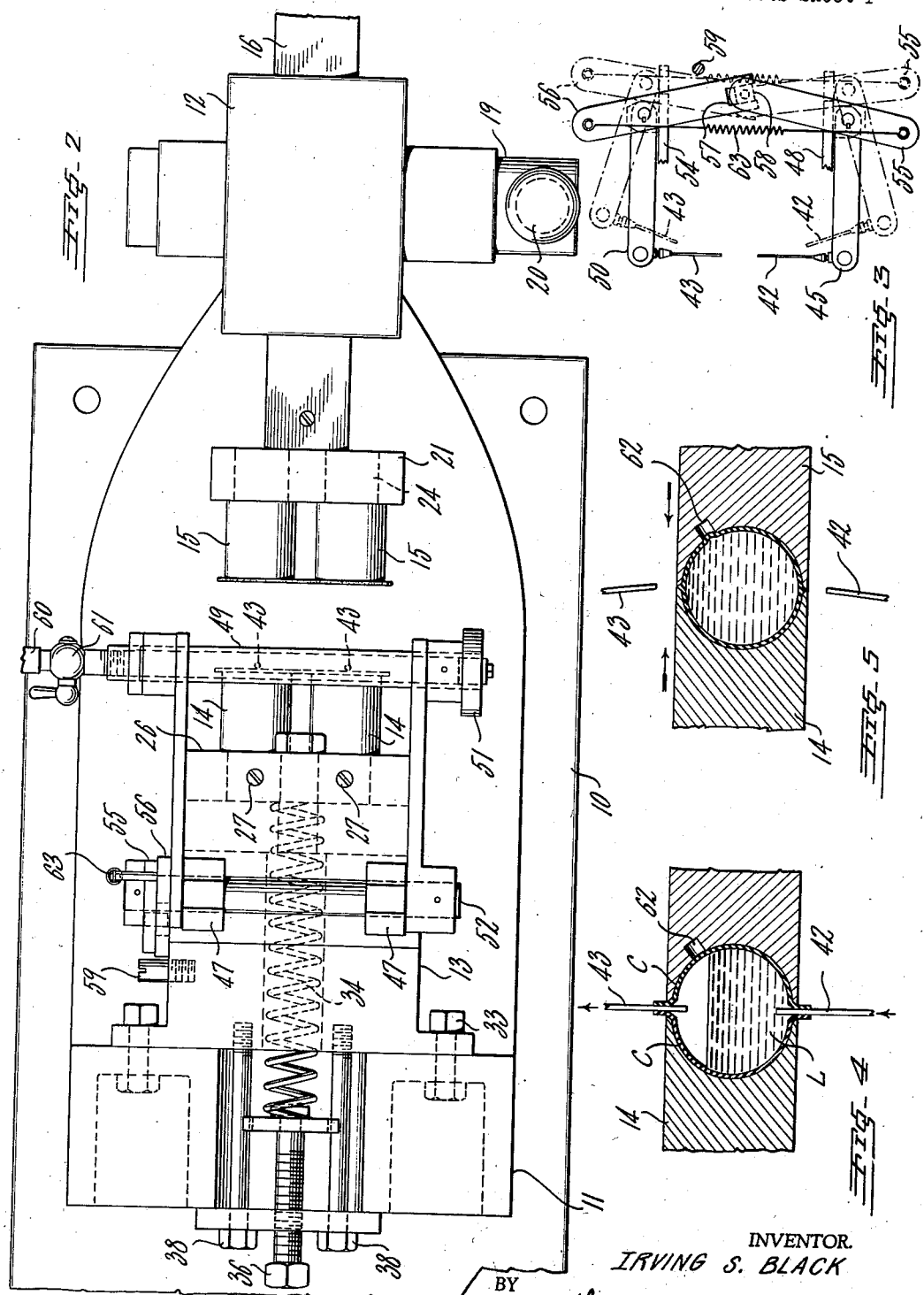

2,306,243

UNITED STATES PATENT OFFICE 2,306,243

METHOD OF AND APPARATUS FOR MAKING FLUID FILLED GOLF BALL CORES

Irving S. Black, Johnston, R. I., assignor to United States Rubber Company, New York, N. Y., a corporation of New Jersey Application August 26, 1941, Serial No. 408,283

11 Claims. (Cl. 154—18)

This invention relates to a method of and apparatus for making fluid containing golf ball cores and for filling the cores as they are produced.

Golf balls are now commonly provided with a mobile or liquid filled core consisting of a hollow rubber core or envelope which is filled with water or other fluid or mobile material.

One method employed heretofore for producing these cores has been to form a hollow rubber envelope or core and then fill the same with fluid by using a hypodermic needle or a small tube inserted through a hole in the core, but when this method is employed it is necessary to close the needle hole by filling the same or placing a patch over the hole.

It has also been proposed heretofore to fill the hollow envelope or core while it is being formed by forming semi-spherical rubber cups and uniting them while they are immersed in a bath of the filling liquid, but this wets the edges of the cups to be united and increases the difficulty of securing a satisfactory bond between the cups.

The present invention contemplates a method of and apparatus for filling a hollow rubber envelope or core while it is being produced by forming a pair of semi-spherical rubber cups through the use of dies, and then introducing a tube between the cups before their edges are brought together so that when the cups are forced one against the other to form a spherical core the cup edges will tightly embrace this tube to make the sphere liquid tight, whereupon the fluid may be injected into the core through this tube. The tube is then withdrawn and the cups are pressed more firmly together by the dies to close the tube hole and bond the cup edges together to form the desired fluid filled core. The material used to form these cups is preferably a vulcanizable rubber and after the core has been filled in the manner just described it may be vulcanized.

In most cases it will be preferably to use two tubes, one positioned below the core forming position and the other above this position to project between the contacting edges of the semi-spherical cups. If this construction is employed the trapped air can escape through the upper tube while the core filling fluid is forced into the core through the lower tube. When the core is filled both tubes are withdrawn so that the tube openings may be closed by pressing the edges of the cups more firmly together.

While the apparatus for carrying out the present method may be variously constructed it is highly desirable that the construction be such that the tubes just mentioned be automatically withdrawn from the core when a predetermined amount of pressure is exerted upon the cups forming dies, to thereby remove these tubes before they are damaged by the pressure upon the dies.

The above and other features of the invention and novel arrangement of parts will be more fully understood from the following description when read in connection with the accompanying drawings showing one good practical form of apparatus for carrying out the invention.

In the drawings:

Fig. 1 is a side elevation with parts in section of a machine for forming golf ball cores in accordance with the present invention;

Fig. 2 is a top plan view of the machine of Fig. 1;

Fig. 3 is a side view of cooperating parts that support the core filling and venting tubes;

Fig. 4 is a longitudinal sectional view taken vertically through the dies and core, showing the latter partly filled;

Fig. 5 is a similar view showing the core entirely filled, and the tubes removed; and Fig. 6 shows the completed core after it has been filled but before it has been vulcanized.

The liquid filled core or envelope herein contemplated is spherical in shape and the core is preferably formed of two similar or substantially similar rubber cups adapted to be united at their edges. These cups are formed in semi-spherical dies and means is provided for forcing one die against the other. A machine embodying the features of the present invention may be provided with as many pairs of these dies as desired and the machine shown is provided with two pairs of such dies so that two cores may be formed at the same time.

In the construction shown the operating parts are supported by a metal frame having the base portion 10, main head 11 and plunger supporting head 12. To the head 11 is bolted a block 13 adapted to yieldingly support two dies 14 as shown. The other two dies 15 are secured to the inner end of a plunger 16 that is supported by the head 12 for longitudinal sliding movement in a horizontal plane. The plunger 16 is shown as having a rack 17 along its lower face adapted to mesh with the gear 18 secured to an operating shaft 19 that is mounted in the head 12 below the plunger 16 to extend transversely thereof. The shaft 19 is provided at one end with the operating bar 20 that is slidably mounted in a hole extending through this shaft and is adapted to be manually engaged to rotate the shaft 19 and move the plunger 16 toward and from the core forming position in a well known manner. The plunger 16 is provided at its inner end with a cross head 21 having a supporting post 22 secured thereto to fit in a hole in the inner end of the plunger and is adapted to be locked therein by the set screw 23. The dies 15 are formed with reduced shanks 24 adapted to fit in holes formed in the cross head 21 as shown.

The dies 14 are likewise provided with reduced shanks 25 adapted to fit in holes formed in a head 26 and to be locked in these holes by the set screws 27. The head 26 is slidably secured to the block 13 by the vertically spaced bolts 28 adapted to slide in sleeves 29 provided in holes formed in the block 13. Each of these bolts is provided at its outer end with a reduced shank which extends through a hole in the head 26 and is secured to the head by a nut 30. The opposite end of each bolt 28 has an enlarged head 31 adapted to slide within a hole 32 formed in the block 13. The arrangement is such that the head 26 is supported for limited sliding movement relative to the block 13 by these bolts 28.

The block 13 is rigidly secured to the head 11 of the main frame by the bolts 33. The die supporting head 26 is continuously urged away from the block 13 by the coiled spring 34 that extends through a central opening in this block and one end of this spring abuts against the inner face of the head 26 and the other end abuts against the movable plate 35 that is secured to the inner end of an adjusting bolt 36. This bolt has threaded engagement with a cross bar 37 which is rigidly secured in place by the relatively long bolts 38, which bolts also serve as a sliding support for the plate 35. The arrangement is such that the tension of the spring 34 may be adjusted as desired by adjusting the threaded bolt 36.

The purpose in mounting the head 26 for yielding movement relative to the block 13 is to thereby control the amount of pressure which the dies 15 may exert upon the dies 14 until the latter have been forced rearwardly throughout the length of travel of the head 26, whereupon a much greater pressure may be exerted upon the dies. The construction is such that only a moderate amount of pressure will be exerted upon the dies while the core filling tubes, to be described are disposed between these dies, but a much greater pressure can be exerted upon these dies after the tubes have been removed.

The semi-spherical rubber cups C are conveniently formed by placing a rectangular sheet of unvulcanized rubber over the dies 14 and a similar sheet over the dies 15, whereupon the rubber sheets will be sucked into the pockets of the dies by suction produced at the base of these semispherical pockets by means of the vacuum tubes 39 leading to vacuum means, not shown. The tubes 39 are connected to the base of these pockets by the tubes 40 and ports 41.

As soon as the rubber sheet stock is placed over the dies as above described, the gear 18 may be manually rotated by the lever 20 to advance the dies 15 towards the dies 14, but before these dies are brought into close proximity to each other, the liquid supply pipes 42 and the air vent pipes 43 should be moved to their operative position in which they are shown in Fig. 1.

As above stated it is highly desirable to provide means for withdrawing the tubes 42 and 43 from their position between the dies before the final sealing pressure is exerted upon the cups by these dies, to thereby avoid crushing the tubes. Means to this end will now be described.

The lower tubes 42 are mounted in and extend upwardly from a transversely extending pipe or manifold 44 which is journalled for a slight angular rotation in the outer ends of the supporting arms 45. These arms are rigidly secured to a rocking shaft 46 which shaft is journalled in the spaced ears 47. These ears are rigidly secured to the supporting plate 48 which is fastened to the underside of the sliding head 26. The upper needles 43 are secured to and extend downwardly from a manifold or vent pipe 49 which is journalled in the outer ends of the arms 50 for rotation through a substantial angle, and this pipe 49 is provided at one end with a head 51 adapted to be engaged by the fingers when it is desired to rotate the needles 43 upwardly out of the way when repairs or adjustments are to be made. The arms 50 are rigidly secured to a transversely extending shaft 52 that is journalled in ears 53 provided upon a supporting plate 54 that is fastened to the upper edge of the sliding head 26.

The arrangement is such that when the dies 15 are forced toward the dies 14 the former will exert sufficient pressure upon the latter to bring the edges of the rubber cups C into engagement with each other about the filling tubes 42 and vent tubes 43 to form a liquid tight core, as will be apparent from Fig. 4. The parts will remain in this relation as the plunger 16 is advanced to force the head 26 rearwardly a short distance against the pressure of the spring 34. For since the tube supporting arms 45 and 50 are supported by the ears 47 and 53 that are secured to the head 26, these tubes will remain between the dies in the position in which they are shown in Fig. 4 during the first portion of the rearward stroke, but these tubes will be withdrawn to the position in which they are shown in Fig. 5, as such rearward stroke is completed.

It is desirable that the upper and lower tubes be moved together and to this end the lower rocking shaft 46 has rigidly secured to one end thereof the lever 55, and the upper rocking shaft 52 had rigidly secured thereto the lever 56. The inner ends of these levers are connected by forming a notch 57 in the lower end of the lever 56 which is adapted to receive a sliding block 58 that is pivotally secured by a pin to the upper end of the lever 55. The arrangement is such that no rocking movement will be imparted to the shafts 46 and 52 as the head 26 is forced rearwardly, until the downwardly extending lever 56 strikes against a pin 59 extending laterally from a side wall of the block 13. As soon as the lever 56 strikes this pin, further rearward movement of the head 26 will cause a rocking movement to be imparted to the shafts 46 and 52 to withdraw the tubes 42 and 43 to the position in which they are shown in Fig. 5 as the head 26 reaches the end of its rearward travel. After the head 26 has reached its rearward position further pressure upon the dies 15 will serve to close the holes in the rubber core from which the tubes were withdrawn, and will also serve to unite the contacting edges of the cups C more firmly.

After sufficient pressure has been exerted upon the cups C to unite their edges about the tubes 42 and 43, and before the head 26 has been forced rearwardly sufficiently to engage the lever 56 with the stop pin 59, the cores formed of the cups C are filled with water, oil or other liquid or mobile material. This is accomplished by supplying the filling liquid under pressure to the lower manifold 44 by means of a flexible pipe 60 connected to the hand valve 61 and secured to one end of the manifold 44. The arrangement is such that when the valve 61 is opened the liquid L will be forced into the cores through the tubes 42 as indicated in Fig. 4, and as the liquid rises in these cores the air will escape through the upper tubes 43. The operator should continue to fill the cores until the liquid reaches the upper manifold 49, to make sure that the cores are completely filled before closing the valve 61.

As soon as the cores are filled further pressure may be exerted upon the plunger 16 to thereby cause the tubes to be withdrawn from the cores and the edges of the cups to be firmly united and the excess rubber cut away, as will be apparent from Fig. 5. This completes the operation of forming the cores and filling them during the core forming operation. It is found in practice that if the cores are completely filled while the parts are in the position in which they are shown in Fig. 4 then the non-compressible liquid L may interfere with the further closing of the dies. This difficulty is readily overcome by forming a small pocket 62 in one of the dies in which the rubber may expand momentarily while the maximum pressure is exerted on the dies.

It is found desirable to provide yielding means to retain the tubes in the core filling position in which they are shown in full lines in Fig. 3 and also yieldingly in the position in which they are shown in dotted lines in this figure. This is accomplished by providing the helical spring 63, the ends of which are connected to the outer ends of the levers 55 and 56 as will be apparent from Fig. 3 so that the spring is stretched. The arrangement is such that when this spring is disposed at one side of the axes of the levers 55 and 56 as shown in full lines in Fig. 3 the tubes will be yieldingly pressed towards each other, and when this spring lies to the opposite side of these axes as shown in dotted lines of Fig. 3, the tubes will be yieldingly urged away from each other.

It will be seen from the foregoing that by employing the present method a golf ball core may be quickly made and filled with liquid during the core forming operation to produce the filled but unvulcanized core shown in Fig. 6 and which is free from any needle holes. The core may then be vulcanized in a well known manner.

Having thus described my invention, what I claim and desire to protect by Letters Patent is:

1. The method of making a liquid filled golf ball core, which consists in forming two semispherical rubber cups, pressing these cups together to unite their edges and form a spherical golf ball core, while the cup edges are in contacting relation but before the operation of pressing them together is completed injecting a filling liquid into the sphere at a point between said edges, and then further pressing the cup edges together to close the passage through which the liquid was injected and seal the liquid inside the golf ball core.

2. The method of making a fluid containing ball core, which consists in forming two semispherical rubber cups, pressing these cups together to unite their edges and form a spherical core, and while the cup edges are in contacting relation but before the operation of pressing such edges together is completed injecting a filling fluid into the sphere at a point between said edges.

3. The method of making a fluid containing ball core, which consists in forming two cupped shell portions of plastic material shaped to form a sphere when united, pressing these shell portions together to unite them and while the edges of said portions are in contacting relation but not firmly bonded injecting a filling fluid into the sphere at a point between said edges.

4. The method of making liquid filled golf ball core, which consists in forming two semispherical rubber cups, providing a tube between the cups, pressing the cups together to cause ther edges to embrace the tube and form a spherical golf ball core, forcing fluid into the core through said tube, and then withdrawing the tube and further pressing the cups together to close the tube hole.

5. The method of making a liquid filled golf ball core, which consists in forming two semispherical rubber cups, providing two tubes between the cups, pressing the cups together to cause their edges to embrace the tubes and form a spherical golf ball core, forcing fluid into the core through one tube and the trapped air out through the other tube, and then withdrawing the tubes and further pressing the cups together to close the tube holes.

6. A machine for making a fluid containing golf ball core and for introducing fluid into the core, comprising in combination, a pair of hollow dies adapted to form rubber cups and to pressure seam their edges together to form a fluid containing spherical core, means for moving one die towards the other to force the edges of the rubber cups together, and a small tube supported for movement to and from a position between the dies and operable to inject fluid into the core between the edges of the contacting cups.

7. A machine for making a fluid containing ball core and for introducing fluid into the core, comprising in combination a pair of hollow dies adapted to form rubber cups and movable one toward the other to unite the cups and form a fluid containing spherical core, a small tube supported for movement to and from a position between the dies and operable to inject fluid into the core between the edges of the contacting cups, and spring means for relieving the tube from excessive die pressure.

8. A machine for making a fluid containing ball core and for introducing fluid into the core, comprising in combination, a pair of hollow dies adapted to form rubber cups, means for moving one die toward the other to unite the cups and form a fluid containing spherical core, a small tube supported for movement to and from a position between the dies and operable to inject fluid into the core between the edges of the contacting cups, and means controlled by said die movement for withdrawing the tube from between the dies.

9. A machine for making a fluid containing ball core and for introducing fluid into the core, comprising in combination, a pair of hollow dies dies adapted to form rubber cups, means for supporting a tube between said dies, mechanism for moving one die toward the other to unite the cups and form a fluid containing spherical core and also cause the edges of the cups to embrace said tube, means for forcing fluid into the core through said tube, and said mechanism being operable to force the cups closer together when the tube is removed.

10. A machine for making a fluid containing ball core and for introducing fluid into the core, comprising in combination, a pair of hollow dies adapted to form rubber cups means for supporting a tube for movement to and from a position between said dies, mechanism for moving one die toward the other to unite the cups and form a fluid containing spherical core and also cause the edges of the cups to embrace said tube, means for forcing fluid into the core through said tube, and means for automatically withdrawing the tube from the core as the die pressure is increased.

11. A machine for making a fluid containing ball core and for introducing fluid into the core, comprising in combination, a pair of hollow dies adapted to form rubber cups, means for supporting a tube below the dies and a second tube above the dies for movement to and from a position between the dies, mechanism for moving one die toward the other to unite the cups and form a fluid containing spherical core and also cause the edges of the cups to embrace the tubes, means for forcing fluid into the lower tube to fill the core as the trapped air escapes through the upper tube, and means for automatically withdrawing the tubes from the core as the die pressure is increased.

IRVING S. BLACK.